United States Patent [19]
Zeitz

[11] 4,341,327
[45] Jul. 27, 1982

[54] DIGITAL PROPORTIONAL METERING PUMPING SYSTEM

[76] Inventor: Vernon Zeitz, 4 Plain Hill Rd., Springfield, Vt. 05156

[21] Appl. No.: 125,339

[22] Filed: Feb. 28, 1980

[51] Int. Cl.³ .......................................... B67D 5/08
[52] U.S. Cl. .................................... 222/63; 222/135; 222/145
[58] Field of Search .................. 222/14, 20, 52, 63, 222/129, 132, 134, 135, 138, 145

[56] References Cited
U.S. PATENT DOCUMENTS

| | | | |
|---|---|---|---|
| 3,887,110 | 6/1975 | Porter | 222/63 X |
| 3,908,862 | 9/1975 | Chandra et al. | 222/63 |
| 3,935,971 | 2/1976 | Papoff et al. | 222/134 |

Primary Examiner—Joseph J. Rolla
Attorney, Agent, or Firm—John J. Simkanich

[57] ABSTRACT

A precision controlled variable speed pumping system for controlling the operation of one or more independently driven pump motors includes one or more valveless rotary pumps each having a reciprocating piston directly driven by an individual stepping motor and a digital control circuit for individually directing the operation of each stepping motor whereby the resultant sum output of the pumps may be utilized for mixing, blending or proportioning fluid flow.

9 Claims, 10 Drawing Figures

ized. Thus, metering in the old
DIGITAL PROPORTIONAL METERING PUMPING SYSTEM

BACKGROUND OF THE INVENTION

This invention relates generally to digital control fluid flow systems and specifically to fluid flow or fluid metering systems utilizing a pump as the fluid flow control mechanism.

Fluid metering systems have very broad applications from analytical chemistry, to microbiolgical firmentation, to medical anesthesia control. In general, most manufacturing processes involve some type of fluid metering.

Fluid metering designs in the past have often utilized pressure differentials through an orifice, or valve gating, or various types of pumps used in combination with orifices or valves to effect a controlled or determinable fluid volume controlled or determinable fluid volume flow rate, or to measure fluid volume flow rate in conjunction with a control valve.

More recently, the use of a pump whose motor speed is controllable has been developed as a positively controlled fluid metering technique. With this technique the direct control of pump operation results in the direct control of fluid. Dependence upon pressurized supplies or orifice sizing is eliminated. Thus, metering in the old sense of the term, i.e., measuring, as a feedback to input, has been minimized as a primary factor in metering control with these newer pumping systems.

These metering systems utilizing a pump for fluid flow control, however, monitor pump motor speed as an indication of the fluid metering rate. Inherent in these systems are inaccuracies and/or non-linearities due to check valve operation or pump fluid slippage or limited pump motor response to changes in electrical control signals which necessitates the monitoring actual pump motor speed.

Attempts have been made with the use of gear pumps using controlled DC motor drives with tachometer or servotype feedback control circuits. Such systems function acceptably at high motor speeds but at low speeds suffer from slippage around the gear teeth of the pump. More recently, systems have been developed using tubing pumps driven by DC motors and DC stepping motors. These systems suffer from tubing wear and non-linearities over moderate ranges of motor speed.

Presently, there is a very limited range of control offered by pump mechanized fluid metering systems. Often the maximum flow rate controllable is no more than ten times the minimum. This limits the capability of the system in proportioning. It also limits the ratio value for plural fluid flow to a factor of no more than 10 to 1.

An object of this invention is to provide a fluid metering system including a speed controlled pump as the metering means which has maximum to minimum range of 100,000 to 1, and which has a metering accuracy of within 0.1%.

A further object of this invention is to provide this system with a ratio or proportioning control circuit connected to operate multiple pumps for providing a desired fluid proportioning to an accuracy of within 0.1% and over a volumetric range of 100,000 to 1.

An even further object of this invention is to provide for a simplified input which determines volume and/or proportioning ratio.

SUMMARY OF THE INVENTION

The objects of this invention are realized in a fluid metering system wherein one or more valveless positive displacement rotary driven pumps are utilized as dispensing elements, each being connected between a given fluid supply and a system output whereby the operation of each pump may be precisely controlled to precisely pump (meter) a determined volumetric rate of a fluid.

A digital control circuit may be connected to precisely control the operation (speed) of individual digital stepping motors connected to drive each of the dispensing element pumps.

A broad range of motor control pulse frequencies supplied by the control circuit may provide a broad range of digital motor speeds, these control pulse trains each having even pulse space distributions throughout the frequency range.

Serial frequency division provides multiple decades of pulse frequency for control of motor speed and dispensing rates (metering rates) allowing for a maximum to minimum metering ratio of 100,000 to 1 or greater.

This frequency division control circuit provides a broad range of discrete frequency outputs determinable by coded inputs to the frequency division components. Frequency scaling as a function of pump displacement offers direct volumetric control.

A rate multiplier and complementing circuit may be employed under the control of a coded input to allow a selectable number of evenly spaced pulses to more than one stepping motor whereof one output constitutes a selected percentage of the control pulses and another output constitutes the complement (i.e., 100% minus selected %) of the control pulses which when scaled represent a direct volumetric ratio allowing for a 100,000 to 1 or greater ratiometric control of multiple dispensing element pumps. Coded inputs affecting volumetric and/or ratiometric control may be in BCD or binary format as obtainable from thumb wheel switches or microprocess, computer or modern output. Scaling and translation of these coded inputs may provide a direct volumetric and/or ratiometric analogue operator readout of control.

The valveless positive displacement pump elements each may include a ported cylinder in which a piston is caused to reciprocate while being driven under rotary motion. This reciprocating motion provides the positive displacement pumping action concurrently with a valving effect at the ports generated through the rotation of a cordal void on the piston. Such pumping elements permit essentially constant pumping accuracy over a broad range of speeds (pump rates).

A stable constant output frequency generator is chosen as the pulse source for the control circuit. Such a frequency generator is selected with an output frequency ranging from 100,000 to more than 1,000,000 times the ultimate digital stepping motor control frequency for low flow rate output. The frequency of such a generator is selected as a function of the design specification range for volumetric output of the metering system and the displacement of the pump element piston. Accuracies within 0.1% are achieved.

DESCRIPTION OF THE DRAWINGS

The advantages, structural features and operation of the subject invention can easily be understood from a reading of the detailed description in conjunction with the accompanying drawings in which like numerals refer to like elements and in which:

FIG. 5c shows typical four phase operating pulses to the full step drive stepping motor of FIG. 1.

FIG. 6b is a timing diagram of the digital operation of the proportioning metering circuit of FIG. 6a.

DETAILED DESCRIPTION OF THE INVENTION

Figure 1:
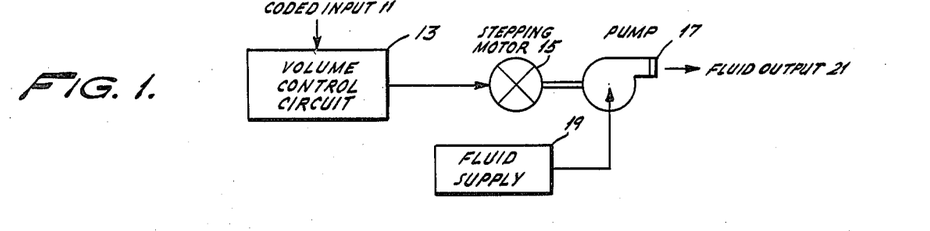
FIG. 1 is a block diagram of a fluid metering system using a circuit controlled pump.

A fluid metering system is provided having a precision control lid, variable rate digital dispensing mode, FIG. 1. A coded input 11 directs the operation of a control circuit 13 which supplies pulses to a full step drive digital stepping motor 15. The stepping motor 15 uses 200 discrete steps to complete a full revolution in driving a dispensing pump 17. The dispensing pumps 17 operates as a dispensing element for the fluid supply 19 to provide a precise dispensing rate (metering rate) of fluid output 21.

Figure 2:
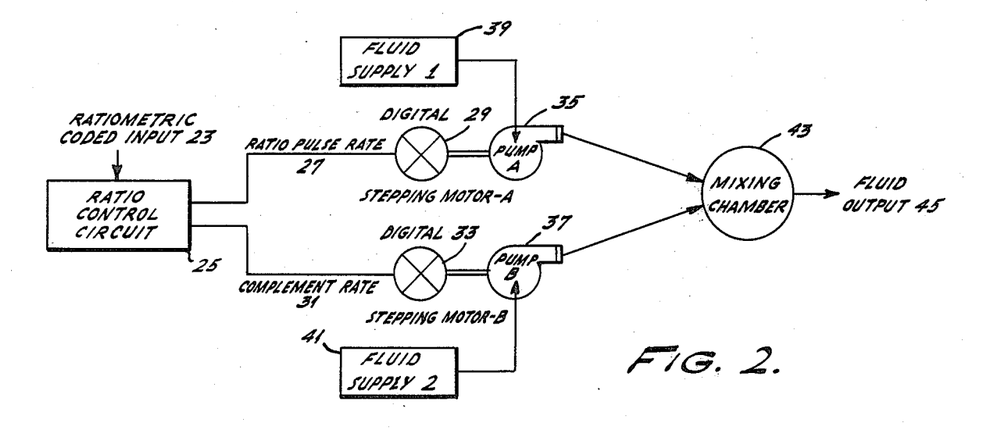
FIG. 2 is a block diagram of a proportioning metering system using circuit controlled plural pumps.

The metering apparatus of FIG. 1 is incorporated as part of a proportioning metering system, FIG. 2, where there are circuit controlled plural dispensing pumps for dispensing a plurality of fluids together whereby the ratio of one fluid to the total fluid dispensed (on a volumetric basis) may be precisely controlled.

A ratiometric coded input 23 controls the operation of a control circuit 25. This control circuit 25 provides a pulse rate representing a selected ratio or precentage of fluid flow 27 to a digital stepping motor 29, and a compliment pulse rate 31 to another digital stepping motor 33.

The stepping motor 29 is connected to drive a first dispensing pump 35, while another stepping motor 33 is connected to drive a second dispensing pump 37. The pump 35 is connected to dispense a first fluid supply 39, while the dispensing pump 37 is connected to pump fluid from a second fluid supply 41. The output from the two pumps 35, 37 is connected to a mixing chamber 43 to provide a fluid output 45 where the volume of fluid 39 to the total volume dispensed is equal to, and established by, the coded input 23. The control circuit 25, individually and simultaneously, controls the operating state of the digital stepping motors 29, 33. This control circuit 25, as with control circuit 13 which operates to control the stepping motor 15 of FIG. 1, operates to individually and simultaneously control the operating speed of each of the digital stepping motors 29, 33. It thereby controls the operating speeds of the pumps 35, 37 to control both the volume of total fluid dispensed, i.e. pumped, through the mixing chamber 43, as well as the ratio of the volume of fluid 39 to the volume of fluid 41 and therefore the proportion of one of the fluids to the total flow rate.

Digital stepping motors 29 and 33 are full step drive stepping motors which take 200 increments or steps to complete a full revolution. This factor enables a precise control of the operating speed of the pumps 35, 37 by the control of drive pulses supplied to the stepping motors 29, 33 by the control circuit 25.

The dispensing pumps 35, 37, FIG. 2, like the dispensing pumps 17 of FIG. 1, are each valveless, positive displacement pumps having a ported cylinder in which a piston is caused to reciprocate and simultaneously rotate. A void in the piston provides a valving operating in conjunction with an input port and an exhaust port. Such pumps have been taught by Pinkerton, U.S. Pat. Nos. 3,168,872 and 3,257,953.

The control circuit 13 provides the control pulses for the metering operation whereby "metering" is the precise control of a volumetric rate of flow. This control circuitry 13 is incorporated as part of the ratio control circuitry 25 of FIG. 2.

Figure 3:
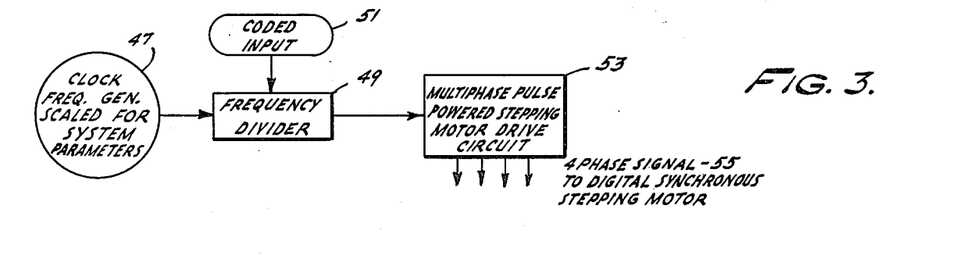
FIG. 3 is a block diagram of the control circuitry for the metering system of FIG. 1.

Volume metric control circuitry 13, includes a clock or frequency generator 47 which is scaled for system parameters, FIG. 3. The output of this frequency generator 47 feeds a frequency divider 49 which operates under a coded input instruction word 51 wherein the desired volumetric rate, or flow rate, is encoded into a binary coded decimal instruction word.

The frequency generator 47 provides a source of oscillating signals, in this case a pulse train which is operated on by the frequency divider 49. Frequency divider 49 operates as a rate multiplier for passing a certain percentage of the pulses provided from the frequency generator 47. These pulses are output from the frequency divider (the rate multiplier) 49 at evenly spaced intervals and passed onto a multi-phase pulse powered stepping motor deive circuit 53. The stepping motor deive circuit 53 provides a four phase signal 55 to the synchronous digital stepping motor 15.

Figure 4A:
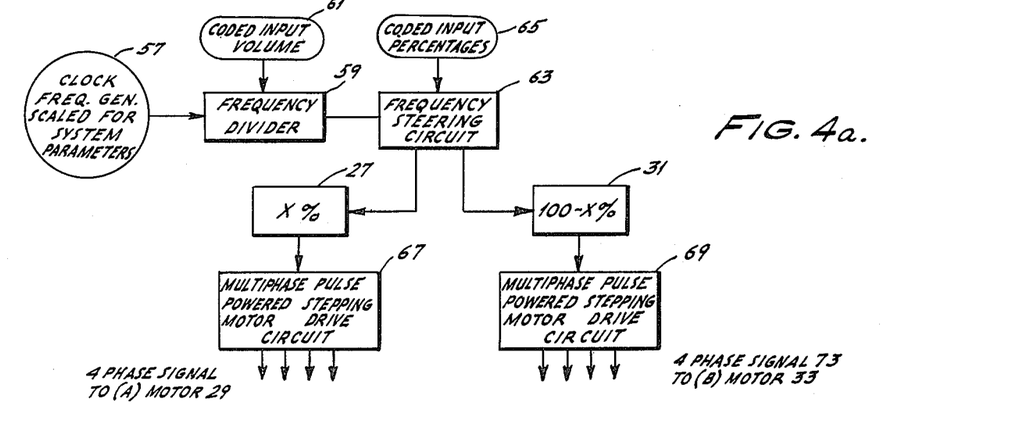
FIG. 4a is a block diagram of the control circuitry for the proportioning metering of FIG. 2.

The ratio control circuit 25, FIG. 4a, also includes a clock or frequency generator 57 which feeds a frequency divider (rate multiplier) 59 operating in response to a coded volume input 61 which is binary coded decimal (BCD) instruction word.

The output from the frequency divider 59 is feed to a frequency steering circuit 63 which operates under the direction of a coded percentage input word 65 which is a BCD ratio instruction.

The frequency steering circuit 63, FIG. 4a, directs the instructed percentage of pulses feed to it from the frequency divider 59 to a multiphase powered stepping motor drive circuit 67 for the digital stepping motor 29. This percentage represents the ratio pulse rate 27 of FIG. 2. The frequency steering circuit 63 also simultaneously directs a compliment percentage of pulses to a second multiphase pulse powered stepping motor drive circuit 69 which controls the operation of the digital stepping motor 33 of FIG. 2. This complimentary pulse rate 31 was discussed above in connection with the FIG. 2. The stepping motor drive circuit 67 provides a four phase signal 71 to motor 29 while the motor drive circuits 69 provides a four phase signal 73 to the motor 33.

The frequency generator 57, FIG. 4a, as well as the frequency generator 47 of FIG. 3, are each chosen to be fixed, precision oscillators which operate a pre-selected frequency, normally chosen to be 100,000 to 1,000,000 times the stepping motor control frequency at a low flow rate (low pulse rate). The frequency is chosen as a function of the volume range for the metering system, the displacement of the dispensing pump (pumps) per stroke, and the number of steps per revolution of the stepping motor (motors) driving the pump (pumps).

The volume BCD instruction word 61, FIG. 4a establishes the total volume (rate of flow) for all of the fluids output 45 of the mixing chamber 43. This is accomplished by scaling down the number of pulses which pass through the frequency divider 59 as a function of the volumetric operating range of the metering system and the fixed frequency output of the frequency generator or oscillator 57.

The percentage of a first fluid to the total fluid output 45, i.e., the ratio of one fluid in the total fluid dispensed, is established by the BCD ratio or percentage instruction 65 to the steering circuit 63. A selection of "x" percentage of fluid 39 will enable "x" percentage of the pulses received from the frequency divider 59 to pass to the motor drive circuit 67 for the stepping motor 29. This controls the operation of pump 35 for dispensing the first fluid 39. The remainder of the pulses which represent the total volume are passed to the other motor drive circuit 69 for controlling the operation of the other stepping motor 33 and the other pump 37 which dispenses fluid from the other supply 41.

The control circuitry 25 shown in detail in FIG. 4a may be expanded when metering more than 2 fluids. This expansion of the circuitry of FIG. 4a is accomplished by the addition of additional steering circuits 75, 77, et al, FIG. 4b to the existing steering circuit 63. Here an "x" percentage coded input provides "x" percent of the control pulses to a first stepping motor-dispensing pump connected to a first fluid, while a "y" percentage coded input to the second frequency steering circuit 75 provides "y" percentage of the pulses to a stepping motor-dispensing pump for a second fluid, while a "z" percentage coded input controls the operation of the third frequency steering circuit 77 to provide "z" percent of the pulses to a stepping motor-dispensing pump connected to a third fluid supply. This may be extended out to as many fluids as are to be metered. In each case, needless to say, the some total of the individual pulses cannot exceed the total pulses available, i.e., the sum total of the individual constituent contributions to the flow rate cannot exceed the total prescribed flow rate, and in fact, must equal that flow rate.

For many scientific and industrial uses it is desirable to calibrate the metering system to a range of from 0 (or 0.001) to 99.9 milliliters per minute.

Figures 4B, 5A:
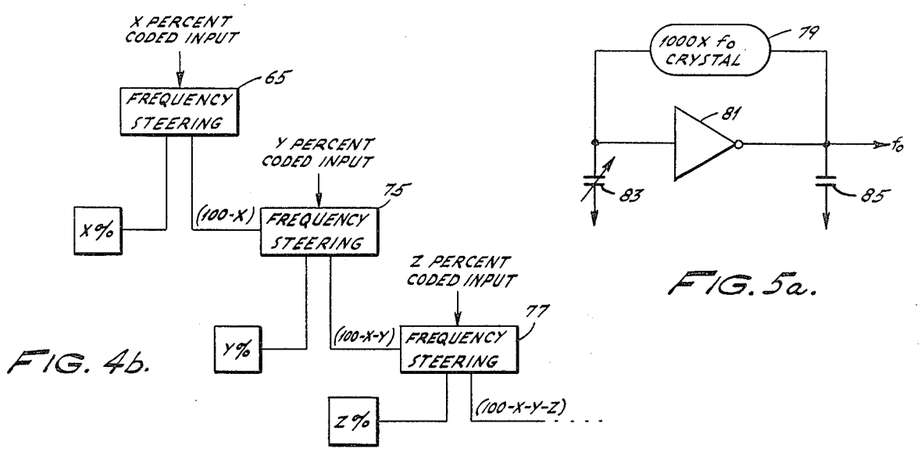
FIG. 4b is a block diagram for additional control circuitry for proportioning additional fluids.
FIG. 5a shows the oscillator circuitry.

A quartz crystal oscillator can be used to implement the frequency generators 47, 57. Here a crystal 79 FIG. 5a is chosen to oscillate at 5333 MHz. A motorola type 4049 CMOS Hex invertor 81 is connected across the crystal 79. A first capacitor 83 which is variable between 1 and 25 pf is connected from the input of the invertor 81 to ground. A 10 pf capacitor 85 is connected across the output of the inverter 81 to ground.

Figure 5B:
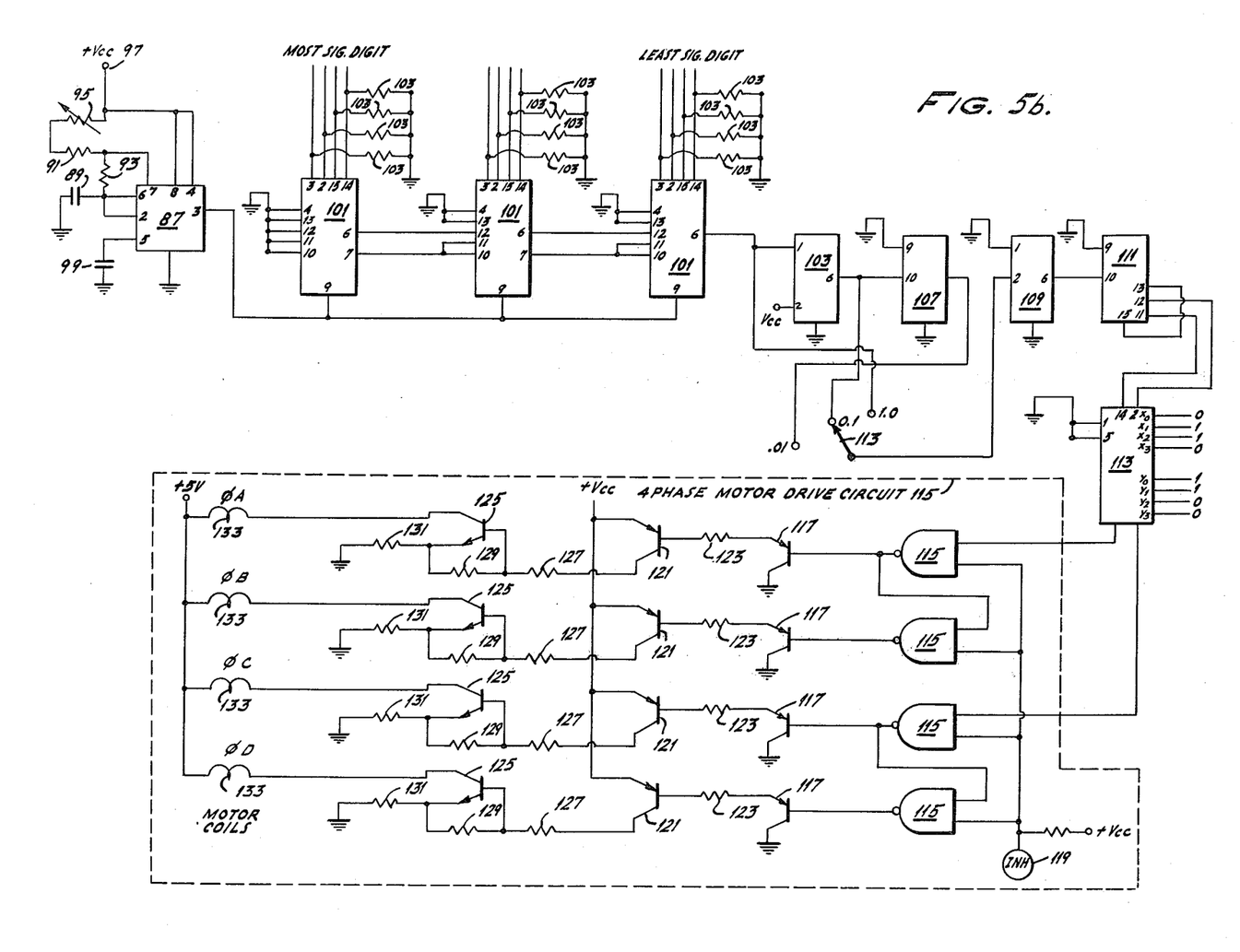
FIG. 5b shows the control circuitry for driving the fluid metering stepping motor of FIG. 1.

The metering control circuit 13 is shown in detail in FIG. 5b. Here an a stable multivibrator, type 55587 as supplied by National Semiconductor corporation is utilized in the oscillator circuit. A 0.0025 microfared capacitor 89 is used in conjunction with the series connection of a 5 kohm resistor 91 and a 2.2 kohm resistor 93 in conjunction with a 1 kohm variable resistor 95 to set the frequency output at 5333 Hz. Supply voltage 97 as well as 0.01 uf capacitance 99 to ground as well as other ground connections are made according to manufacturers instructions.

The pulse output from the multivibrator 87 is fed to clock three BCD rate multipliers 101 in parallel. These rate multipliers 101 are RCA type 4527, and are serially connected into a frequency multiplier for frequency divider which operates from 0 to 999 in increments of 1. These rate multipliers 101 are connected according to manufacturers instructions for a 16 bit instruction word, with four input lines to each of the rate multipliers 101. Each input line to each of the right multipliers has a 100 kohm resistor to ground 103 which provides a binary coded decimal instruction word off of a thumb wheel switch.

The serial output from the rate multipliers 101 is fed to a serial frequency divider circuit which comprises four Motorola type M.C. 14518P up counters 103, 107, 109, 111. The output from the BCD rate multiplier 101 clocks the first up counter 103 and goes to a first position of a selector switch 113. A second position of the selector switch 113 connects the output of the first up counter 103 as well as the input of the second up counter 107. The output of the second up counter 107 connects to the third position of the selector switch 113.

This switch 113 provides a decade divider function whereby the first position is a division by 1, the second position is a frequency division by 10 and the third position is a frequency division by 100.

The wiper of the selector switch 113 is connected to the input of the third up counter 109 which in turn feeds the fourth up counter 111. These latter two up counter 109, 111, provide a divide by 10 function which acts as a pulse shaper to shape the pulses passing therethrough.

The "$Q_0$" "$Q_1$" outputs from the fourth up counter 111 are connected to a Motorola type MC 14539B four channel data selector 113 which is connected according to manufacturers instructions into a four phase multiplexor with a two bit word output. This two bit word output operates as an encoder to drive the four phase motor drive circuit 115.

The four phase motor drive circuit 115 is used for driving digital stepping motors such as those supplied by the Superior Electric Company of Bristol, Conn., model No. M091FD06. This circuit includes four parallelly operated NAND gates 115 which are each connected to drive a PNP switching transistor 117. The NAND gates 115 are available on Motorola 4011 CMOS chips. These NAND gates 115 also have a paired serial connection whereby the output of the first one thereof is connected to an input of the second one and the output of the third one thereof is connected to the input of the fourth one. An input to each of the four NAND gates 115 is connected to and inhibit or disable input 119. The two outputs from the multiplexor 113 are connected to an input of the first NAND gate 115 and the third NAND gate 115 respectively.

The switching transistors 117 are each Texas Instrument type 4403 which are each connected to trigger a second 4403 type PNP transistor 121 through a 10 kohm resistance 123.

The output of each of the transistors 121 drives an RCA type 2N6388 power Darlington transistor 125 through a 220 ohm resistance 127. The Darlington transistors 125 each have a 390 ohm feedback resistance 129 and a 0.39 ohm resistance 131 from emitter to ground. One of each of the four phase coils 133 of the stepping motor 15 is connected to each of the Darlington power transistors 125.

Figures 5C, 6B:
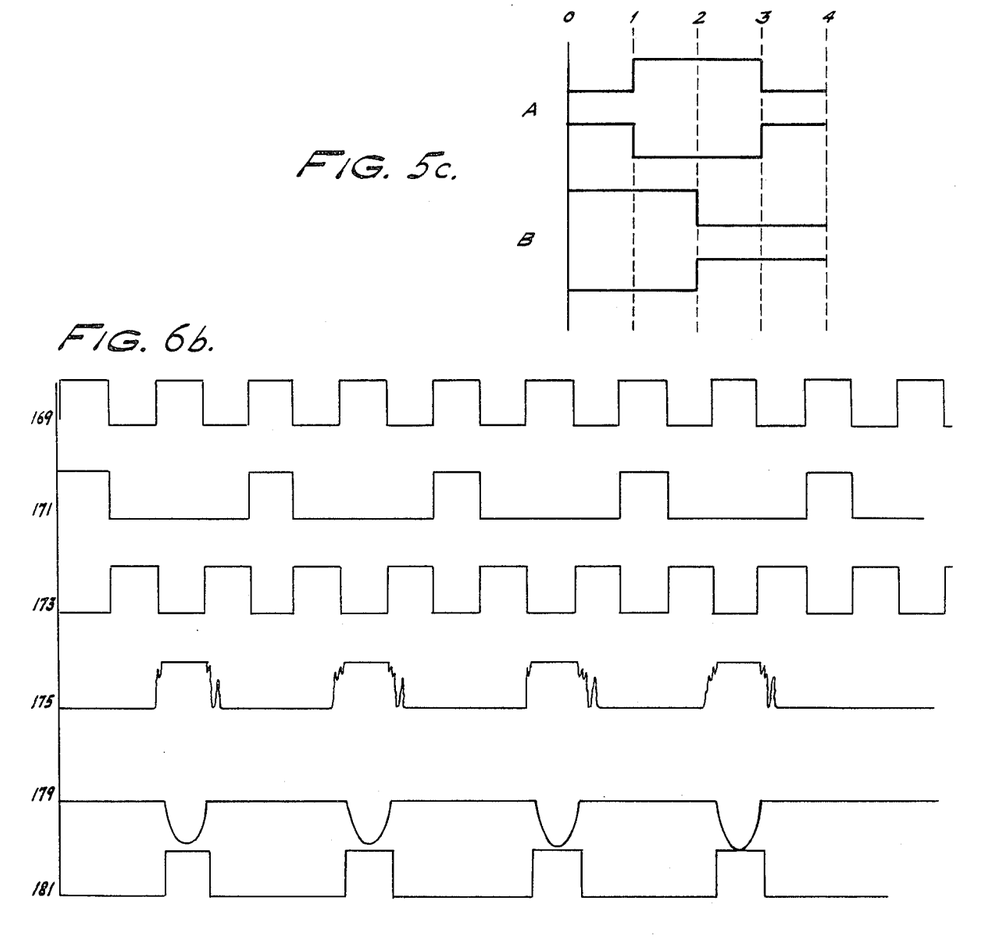

FIG. 5c shows the stepping drive sequences for each of the phases of the stepping motor as provided by the four phase motor drive circuit 115.

Figure 6A:
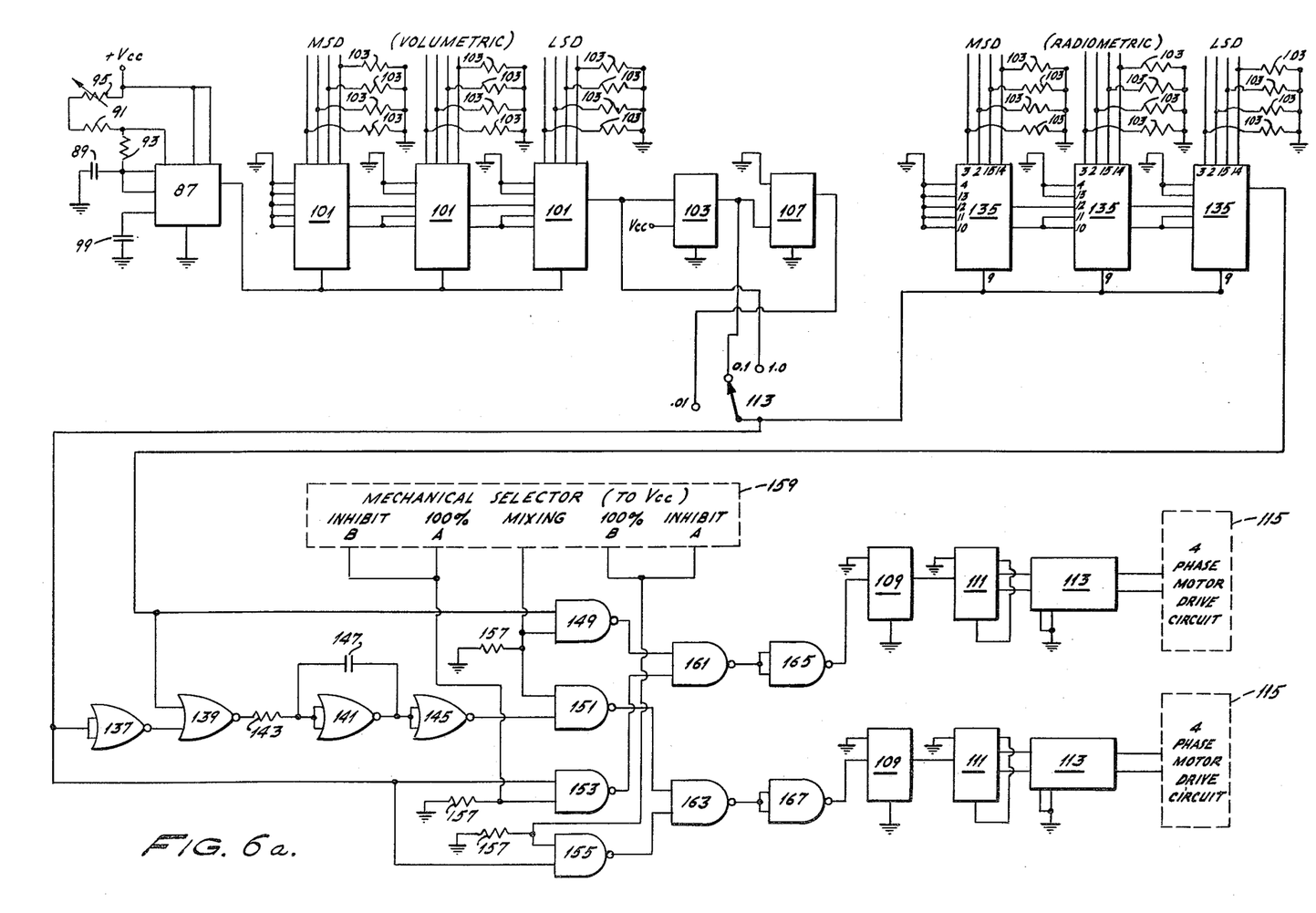
FIG. 6a shows the control circuitry for the proportioning metering system of FIG. 2.

FIG. 6a shows a detailed circuit diagram of the ratio control circuit 25 previously shown as a block diagram in FIG. 4a. This circuit receives both a coded volume instruction word 61 and a coded ratio or percentage instruction word 65. As such the circuit includes the same oscillator including the same astable multivibrator 87 as the circuit of FIG. 5b. An identical three component connected serially rat multiplier 101 is connected to the output of this oscillator multivibrator 87. These rate multipliers 101 receive the volumetric instruction word 61 from three thumb wheel switches. As with the previous circuit of FIG. 5b, the output of these rate multipliers 101 feeds a first and second up counters 103 107 and a decade divider switch 113, with the connections as previously described.

However for this circuit, FIG. 6a, the wiper of the switch 113 is connected to clock three serially connected rate multipliers 135. These second rate multipliers 135 receive a coded percentage ratio instruction word 65. Three thumb wheel switches are used to supply the coded instruction word 65 to the second serially connected rate multipliers 135. The second serially connected rate multipliers 135 are connected with identical circuit interconnections including the resistance 103 on each input thereto as the first rate multipliers 101.

The wiper of the decade divider selector switch 113 is also connected to the input of a compliment generating circuit which includes a connection to the inverter 137. Invertor 137 drives a NOR gate 139 which in turn drives an integrator 141 through a series connection of a 39 kohm resistance 143. The integrator 141 drives another invertor 145 which acts as a pulse shaper. The integrator 141 has a feedback capacitance of 0.001 microfareds 147. Each of these components 137, 139, 141, 145 are available on Motorola chip, model 4001. The integrator 141 operates to smooth out spikes caused by propagation delays while the pulse shaper 145 shapes the pulse propagating therethrough.

Four motorola type 401 CMOS NAND gates 149, 151, 153, 155 are connected in parallel to operate as an electronic selector for enabling or passing selected signals. These NAND gates 149, 151, 153, 155 each have a 100 kohm resistance 157 connected from ground to one of the inputs thereof. This input is also connected to the mixing function switch of a mechanical selector 159. The wiper of the decade divider selector 113 besides being connected to the input of the invertor 137 is also connected to the other input of the third of the selection NAND gates 153 and the other input of the fourth selection NAND gates 155.

The output from the second rate multiplier 135 is connected to the other input of the NOR gate 139 as well as the other input of the first selection NAND gate 149.

As referred to above, the output from the pulse shaper 145 feeds the other input of the second selection NAND gate 151.

A combination "inhibit B and select 100 percent A" function switch of the mechanical selector 159 is connected to the resistor 157 input of the third selection NAND gate 153. A combination "100 percent B and inhibit A" function switch of the mechanical selector 159 is connected to the resistor 157 input of the fourth selection NAND gate 155.

The outputs from the first and third selection NAND gates 149, 153 are input to another two input NAND gate 161, while the outputs from the second and fourth selection NAND gates 151, 155 form the two inputs to another NAND gate 163. The NAND gate 161 drives a second NAND gate 165, while the NAND gate 163 drives a second NAND gate 167. NAND gates 161 163, 165, 167 are also Motorola type 4011.

This portion of the circuit acts to select either a fluid flow of 100 percent of the first fluid or 100 percent of the second or a mixture of both fluids. The selector 159 operates exclusively, i.e. when it is in the 100 percent A mode it is out of the mixing mode or the 100 percent B mode. Only the mixing mode permits the dispensing of a mixture of both fluids. When there is a selection of 100 percent of either the first fluid or the second fluid the ratiometric construction is overridden and the ratio pulse rate and the compliment pulse rate are added together. Thus NAND gate 165 will provide an output when the first fluid is required to be dispensed, either as 100 percent, i.e. the sum of the ratio pulse rate and the complimentary rate, or as a mixture, i.e. just the ratio rate.

The NAND gate 167 will perform a similar function with respect to the second fluid, and in this case, in the mixing mode, the complimentary rate being passed thereby.

A pair of up counters 109, 111 and a multiplexer 113 are connected on the output of each of teh NAND gates 165 and 167. These components are identical to the components described for FIG. 5b hereinabove and are connected in an identical manner to perform an identical function. The output of the first of these multiplexors 113 is used to drive the four phase motor drive circuit 115 or the first digital stepping motor 29, while the second of these multiplexers is used to drive the second four phase motor drive circuit 115 for the second digital stepping motor 33.

The circuitry downstream from the decade divider selector switch 113 can be duplicated and ganged serially to provide the circuit expansion needed for the block circuitry of FIG. 4b for mixing three or more fluids.

FIG. 6b is a timing diagram for the control pulses processed by the compliment generator, selection and ratio metric portions of the circuit of FIG. 6a. Line 169 represents the pulse train available from the decade divider selection switch wiper 113. Line 171 represents the pulse output from the second rate multiplier 135 and input to NOR gate 139 and first selection NAND gate 149. Line 173 represents the output from the invertor 137, while line 175 represents the output from the NOR gate 139 which is input into the integrator 141. Line 179 represents the output from the integrator 141 while line 181 represents the output from the pulse shaper 145 of the compliment generator circuit.

Many changes can be made in the above described fluid metering apparatus without departing from the intent and scope thereof. Therefore, it is intended that all matter contained in the above description and shown in the accompanying drawings be interpreted as illustrative and not be taken in the limiting sense. Variations on the fluid metering system including its proportioning features are intended to be within the intent and scope hereof.

What is claimed:
1. A fluid metering apparatus comprising:
a first means for dispensing a first fluid;

a second means for dispensing another fluid;

means, associated with said first and second dispensing means, for combining said first and second dispensed outputs; and digital means for individually and simultaneously controlling the operation of said first and second dispensing means, said digital control means providing a metered ratio of said first dispensed output to total dispensed output and including a first digital stepping motor operatively connected to said first dispensing means, a second digital stepping motor operatively connected to said second dispensing means, and control circuit means for individually and simultaneously controlling the operating states of said first and said second digital stepping motors wherein said control circuit means includes means for providing a series of fixed frequency pulses, means for dividing the pulse frequency in evenly spaced pulses, said frequency divider means being connected to said pulse providing means for providing a divided down output, and means, connected to said frequency divider means, for steering a first portion of said divided down frequency output pulses to a first path while simultaneously steering a second portion of said divided down frequency output pulses to a second path, wherein said first path connects to said first digital stepping motor and said second path connects to said second digital stepping motor.

2. The apparatus of claim 1 wherein said frequency divider means operates responsive to a coded volumetric input thereto; wherein said frequency steering means operates responsive to a coded ratiometric input thereto; wherein said first dispensing means includes a first valvless positive displacement pump driven by said first digital stepping motor; and wherein said second dispensing means includes a second valveless positive displacement pump driven by said second digital stepping motor, said first and second pump outputs each being connected to said combining means.

3. A digital proportional metering pumping system comprising:

a plurality of dispensing pumping means, each pumping means connected for pumping a separate fluid, said pumping means outputs being interconnected for combining each said pumping means output into a sum total flow;

a plurality of digital stepping motors, one said stepping motor driving each said pumping means; and circuit means for providing individual control pulse inputs to each said stepping motor wherein said circuit means includes a fixed oscillator having a pulse train output, a first rate multiplier connected to said osctllator output dividing down said oscillator output pulse frequency, and a frequency steering circuit selecting a proportion of said rate multiplier output pulses to a first said digital stepping motor and a proportion of said rate multiplier output pulses to a second said digital stepping motor.

4. The system of claim 3 wherein said plurality of pumping means each includes a positive displacement pump, each of said pumps being interconnected on their outputs and each of said pumps being driven by one of said digital stepping motors.

5. The system of claim 4 wherein said circuit means also includes a decade divider connected to the output of said first rate multiplier and a pulse shaper connected to said decade divider.

6. The system of claim 5 wherein said frequency steering circuit includes:

a second rate multiplier connected to said pulse shaper output;

a complement generator circuit connected to said pulse shaper output;

a plurality of four channel multiplexors, connected one each to a four phase stepping drive circuit of one of said stepping motors; and connection circuit means for, selectively, (a) connecting said second rate multiplier output to a first said four channel multiplexor, exclusively, (b) connecting said complement generator circuit to another said four channel multiplexor, exclusively, (c) connecting said second rate multiplier and its respective said four channel multiplexor and said complement generator circuit and its respective four channel multiplexor, simultaneously.

7. The system of claim 6 wherein said first rate multiplier is a binary coded decimal type operating responsive to a first binary coded decimal word input thereto, said first word being a system volume flow rate instruction; wherein said second rate multiplier is a binary coded decimal type operating responsive to a second binary coded decimal word input thereto, said second word being a ratio instruction of a first fluid flow proportional to total system flow.

8. The system of claim 7 wherein said decade divider selectively divides said pulse frequency by 1, 10 and 100.

9. A fluid metering system comprising:

means for providing a source of oscillating signals;

means, associated with said oscillating signal source for encoding a volumetric flow rate;

means, associated with said volumetric encoder means for passing a portion of said oscillating signals as a function of said flow rate encoded;

means for encoding a proportional flow rate ratio, said ratio representing a proportion of at least one fluid flow to a total flow rate of which said one fluid is a constituent; and means for steering said passed oscillating signals between a first stepping motor driven fluid pump and to at least one other stepping motor driven fluid pump, said steered oscillating signals controlling the operation of said respective stepping motor driven fluid pumps, said steering means being connected between said passing means and said respective pumps, said pumps being connected each to a separate fluid on their input and to a mixing chamber on their output for providing a mixture wherein said one fluid constitutes said encoded proportion thereof.

* * * * *

UNITED STATES PATENT AND TRADEMARK OFFICE
CERTIFICATE OF CORRECTION

PATENT NO. : 4,341,327
DATED : July 27, 1982
INVENTOR(S) : Vernon Zeitz

It is certified that error appears in the above-identified patent and that said Letters Patent are hereby corrected as shown below:

Col. 3, line 43: "precentage" should be --percentage--
Col. 4, line 12: "operating" should be --operation--
Col. 5, line 63: "kohm" should be --k ohm--
Col. 5, line 64: "kohm" should be --k ohm--
Col. 6, line 11: "kohm" should be --k ohm--
Col. 6, line 59: "kohm" should be --k ohm--
Col. 7, line 35: "kohm" should be --k ohm--
Col. 7, line 47: "kohm" should be --k ohm--
Col. 9, line 54: "osctllator" should be --oscillator--

Signed and Sealed this

Second Day of November 1982

[SEAL]

Attest:

Attesting Officer

GERALD J. MOSSINGHOFF
Commissioner of Patents and Trademarks